(12) United States Patent
Luo et al.

(10) Patent No.: US 10,768,201 B2
(45) Date of Patent: Sep. 8, 2020

(54) SYSTEM FOR ESTIMATING AIRSPEED OF AN AIRCRAFT BASED ON A DRAG MODEL

(71) Applicant: The Boeing Company, Chicago, IL (US)

(72) Inventors: Jia Luo, Bellevue, WA (US); Douglas Lee Wilson, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 573 days.

(21) Appl. No.: 15/620,224

(22) Filed: Jun. 12, 2017

(65) Prior Publication Data
US 2018/0356439 A1  Dec. 13, 2018

(51) Int. Cl.
*G01P 21/02* (2006.01)
*B64D 45/00* (2006.01)
*G01P 13/02* (2006.01)
*G01P 5/16* (2006.01)

(52) U.S. Cl.
CPC ........ *G01P 21/025* (2013.01); *B64D 45/0005* (2013.01); *G01P 5/16* (2013.01); *G01P 13/025* (2013.01)

(58) Field of Classification Search
None
See application file for complete search history.

(56) References Cited

U.S. PATENT DOCUMENTS

| | | | | |
|---|---|---|---|---|
| 4,110,605 A * | 8/1978 | Miller | ..... | G01G 19/07 |
| | | | | 701/124 |
| 10,006,928 B1 * | 6/2018 | Hagerott | ..... | G01P 13/025 |
| 2010/0100260 A1 * | 4/2010 | McIntyre | ..... | G01P 5/16 |
| | | | | 701/6 |
| 2014/0129057 A1 | 5/2014 | Hall et al. | | |
| 2015/0100184 A1 * | 4/2015 | Nathan | ..... | G01C 23/00 |
| | | | | 701/7 |
| 2016/0023776 A1 | 1/2016 | Ganguli | | |
| 2016/0161524 A1 * | 6/2016 | Delporte | ..... | G01P 5/14 |
| | | | | 702/96 |
| 2017/0356925 A1 * | 12/2017 | Berdoulat | ..... | B64D 43/00 |
| 2019/0293291 A1 * | 9/2019 | Fox | ..... | F23R 3/06 |

OTHER PUBLICATIONS

EPO, Extended European Search Report, dated Sep. 3, 2018.

* cited by examiner

*Primary Examiner* — Alexander Satanovsky
*Assistant Examiner* — Brent A. Fairbanks

(57) ABSTRACT

A system and method for estimating a plurality of airspeed parameters of an aircraft is disclosed. The system comprises one or more processors and a memory coupled to the processor. The memory storing data comprises a database and program code that, when executed by the one or more processors, causes the system to receive a plurality of operating parameters that each represent an operating condition of the aircraft. The system is further caused to determine a stability-axis drag coefficient based on the plurality of operating parameters. The stability-axis drag coefficient quantifies a stability-axis drag of the aircraft created during high speed conditions. The system is caused to determine a body-axis lift coefficient based on the plurality of operating parameters, which corresponds to a lift of the aircraft created along a vertical body-axis. The system is also caused to determine a dynamic pressure, which is used to estimate the airspeed parameters.

22 Claims, 10 Drawing Sheets

SYSTEM FOR ESTIMATING AIRSPEED OF AN AIRCRAFT BASED ON A DRAG MODEL

FIELD

The disclosed system and method relate to a system for estimating airspeed of an aircraft and, more particularly, to a system that includes a model for estimating airspeed, especially at high speed conditions of the aircraft.

BACKGROUND

A pitot tube or probe is typically mounted on a vehicle and measures the velocity of a vehicle relative to a fluid in which the vehicle is moving. In one application, a pitot probe is mounted upon an aircraft and measures the velocity of the aircraft relative to the air mass during flight. Pitot probes generally include a hollow tube that defines an open end pointing in the direction of fluid flow or vehicle movement. The hollow tube of the pitot probe contains a fluid, such as air in the case of an aircraft. The pressure within the pitot probe provides a stagnation pressure measurement, which is also called total pressure. The total pressure is combined with a static pressure, which is typically measured at a different location on the aircraft fuselage, or on the side of the pitot probe in the case of a combined pitot-static probe, in order to determine an impact pressure. The impact pressure is used to determine the airspeed of the aircraft.

Sometimes pitot probe based airspeed systems may produce incorrect airspeed readings. The incorrect reading may be caused by issues such as probe contamination, damage to the probe, or maintenance issues. Some examples of probe contamination include, but are not limited to, ice, volcanic ash, and insect invasion. Systems that estimate airspeed based on a model of an aircraft currently exist, however these systems may not be able to robustly calculate an accurate airspeed during some types of operating conditions. More specifically, these systems may not be able to calculate accurate airspeeds during high speed flight regimes, especially at transonic Mach numbers. Also, the airspeed calculated by the system may be susceptible to variations of a sensed angle of attack of the aircraft. Finally, the airspeed may also be susceptible to any discrepancies of a lift model, even in regimes where it is possible to calculate accurate airspeeds.

SUMMARY

The disclosure is directed to an improved system for estimating the airspeed of an aircraft, especially during high speed operating conditions. The aircraft operates at high speed conditions when flaps of the aircraft are retracted and the aircraft travels at about 0.4 Mach or higher.

In one example, a system for estimating a plurality of airspeed parameters of an aircraft is disclosed. The system comprises one or more processors and a memory coupled to the processor. The memory storing data comprises a database and program code that, when executed by the one or more processors, causes the system to receive a plurality of operating parameters that each represent an operating condition of the aircraft. The system is further caused to determine a stability-axis drag coefficient based on the plurality of operating parameters. The stability-axis drag coefficient quantifies a stability-axis drag of the aircraft created during high speed conditions. The system is caused to determine a body-axis lift coefficient based on the plurality of operating parameters. The body-axis lift coefficient corresponds to a lift of the aircraft along a vertical body-axis created during low speed conditions. The system is also caused to determine a dynamic pressure based on one of the stability-axis drag coefficient and the body-axis lift coefficient. The system is also caused to estimate the plurality of airspeed parameters based on the dynamic pressure.

In another example, a method of estimating a plurality of airspeed parameters of an aircraft is disclosed. The method includes receiving, by a computer, a plurality of operating parameters that each represent an operating condition of the aircraft. The method also includes determining, by the computer, a stability-axis drag coefficient based on the plurality of operating parameters. The stability-axis drag coefficient quantifies a stability-axis drag of the aircraft created during high speed conditions. The method also includes determining a body-axis lift coefficient based on the plurality of operating parameters, the body-axis lift coefficient corresponding to a lift of the aircraft along a vertical body-axis created during low speed conditions. The method includes determining a dynamic pressure based on one of the stability-axis drag coefficient and the body-axis lift coefficient. Finally, the method includes estimating the plurality of airspeed parameters based on the dynamic pressure.

Other objects and advantages of the disclosed method and system will be apparent from the following description, the accompanying drawings and the appended claims.

DETAILED DESCRIPTION

Figure 1:
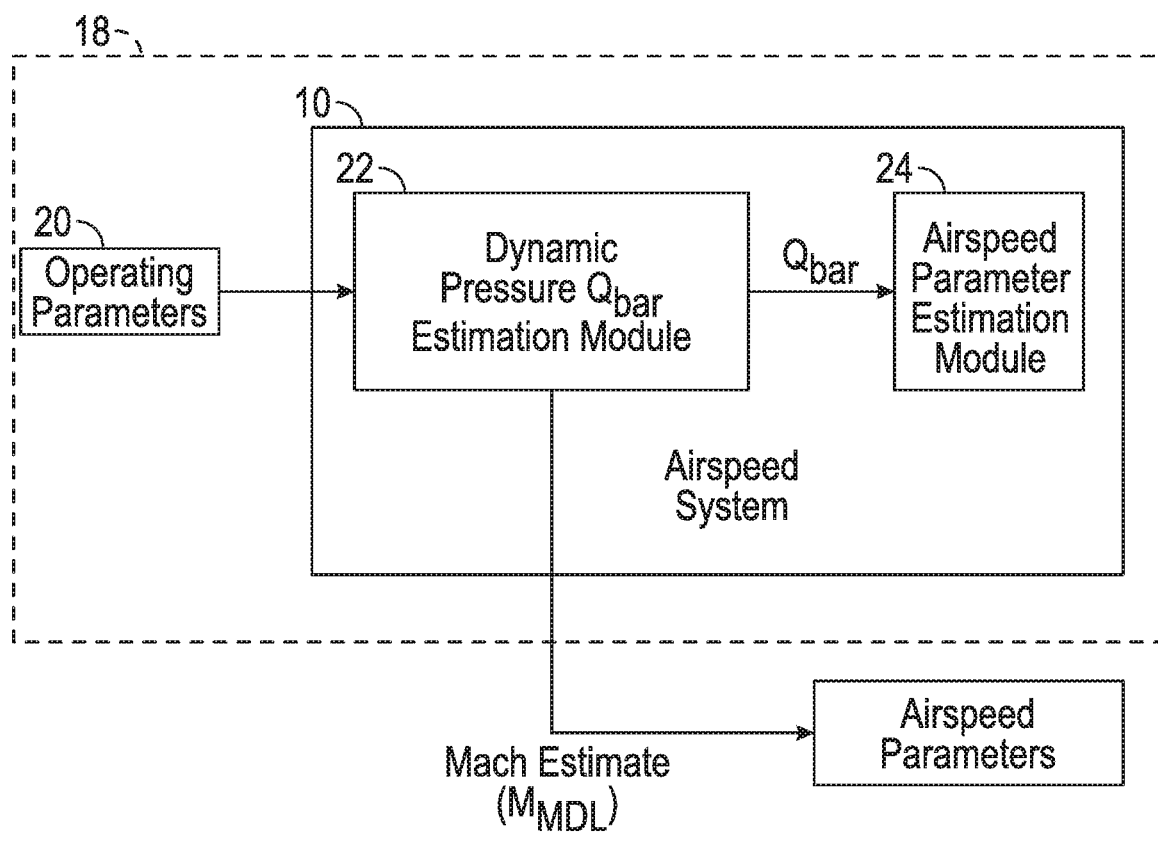
FIG. 1 is an exemplary schematic block diagram of the disclosed airspeed calculation system of an aircraft.

FIG. 1 is an exemplary schematic block diagram of the disclosed airspeed system 10. The airspeed system 10 estimates airspeed parameters of an aircraft 18 constantly, without relying upon traditional pitot probe measurements. The airspeed system 10 receives as input a plurality of operating parameters 20, which are each described in greater detail below. The operating parameters 20 are each representative of a particular operating condition of the aircraft 18. The airspeed system 10 includes a dynamic pressure module 22 and an airspeed parameter estimation module 24. The dynamic pressure module 22 receives as input the operating parameters 20, and estimates a dynamic pressure Qbar value based on the input. The airspeed parameter estimation module 24 receives as input from the dynamic pressure module 22 the dynamic pressure Qbar, and estimates at least one airspeed parameter based on the dynamic pressure Qbar. Specifically, as explained in greater detail below, the airspeed parameters include a Mach number $M_{MDL}$, an equivalent airspeed $Veas_{MDL}$, an impact pressure $Qc_{MDL}$, a calibrated airspeed $Vcas_{MDL}$, and a true airspeed $Vt_{MDL}$ of the aircraft 18. The airspeed parameters are used to constantly calculate the airspeed of the aircraft 18.

The operating parameters 20 that are input into the airspeed system 10 include an angle of attack α, an angle of sideslip β, a plurality of control surface positions, a stabilizer surface position, a flap position, a landing gear position, static pressure ps, engine speed N1, total air temperature $T_{TOT}$, aircraft weight W, and acceleration or load factor. In one embodiment, a pressure altitude hp may be used instead of the static pressure ps, and an engine pressure ratio EPR may be used instead of the engine speed N1. Control surfaces of the aircraft 18 include, without limitation, ailerons, flaperons, rudders, spoilers, elevators, trim devices, and flaps. The control surface positions represent the position of moveable flight control surfaces of the aircraft 18. In the embodiments as described the control surface position may refer to the various positions of a plurality spoilers 8 (FIG. 2) and a rudder 6 (FIG. 2) of the aircraft 18.

Figure 2:
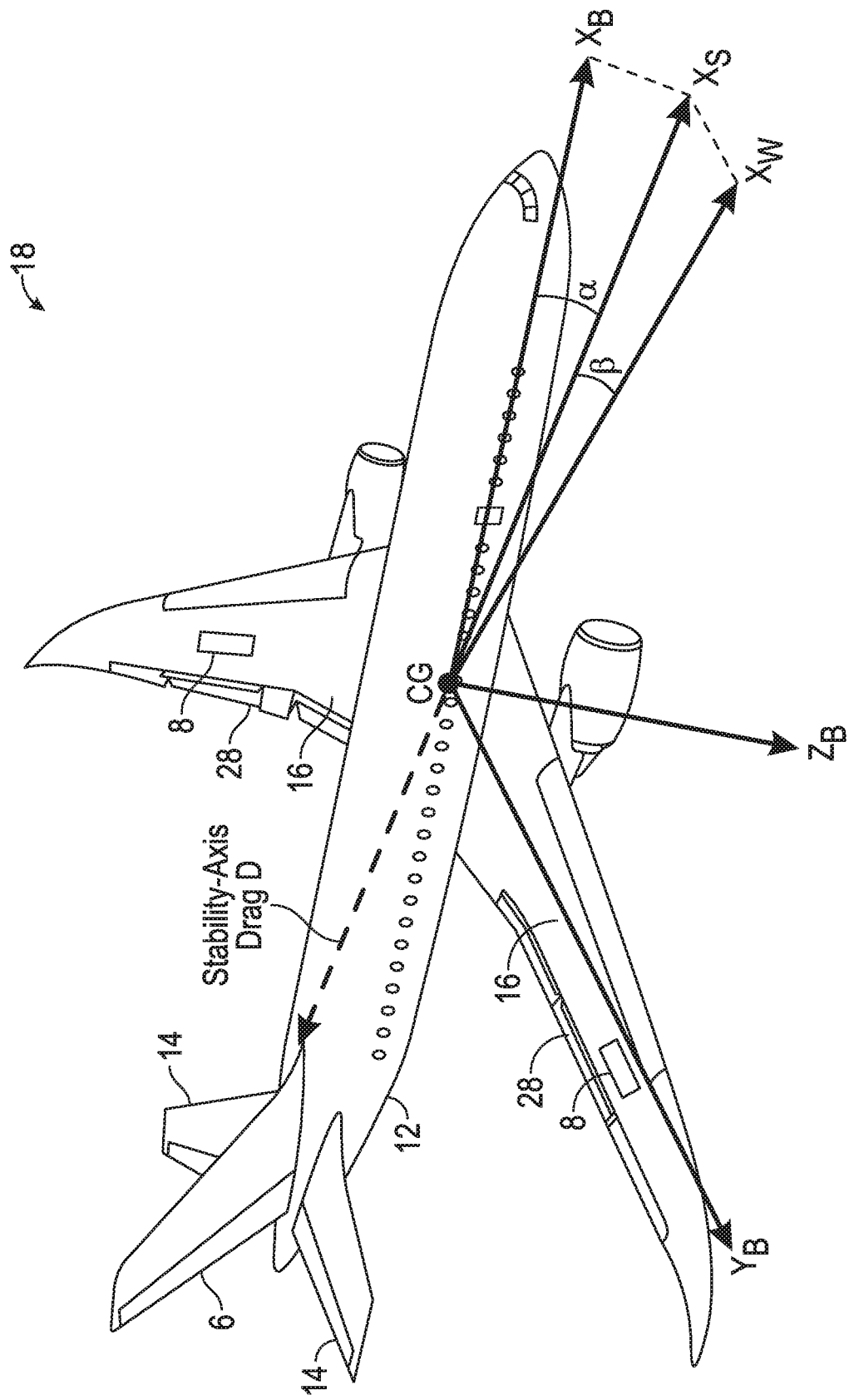
FIG. 2 is a perspective view of an exterior of the aircraft shown in FIG. 1, where a stability-axis drag based on the aircraft operating at high speed conditions is illustrated.

Referring now to FIG. 2, the stabilizer surface position is a measure of an incidence angle of the horizontal stabilizer 14 relative to a body 12 of the aircraft 18, as seen in a side view. The flap position is indicative of position of a plurality of trailing edge flaps 28 (FIG. 2) of the wings 16. More specifically, the flap position indicates whether the trailing edge flaps 28 are in a retracted position. In one embodiment, the aircraft 18 includes a three-position landing gear lever, where the three positions are DOWN, UP, and OFF. The landing gear position would be DOWN, UP, or some value in-between if the gears are in transit. The total air temperature $T_{TOT}$ may also be referred to as the stagnation temperature, and is measured by a total air temperature probe (not illustrated) mounted on the aircraft 18.

The load factor is the ratio of total aerodynamic and propulsive force generated by the aircraft 18 to the total weight of the aircraft 18. For example, during straight and level flight of the aircraft 18, the total lift is equal to the total weight. Accordingly, the load factor is one gravity. The acceleration or load factor is determined by one or more accelerometers. However, many types of accelerometers actually measure the load factor. If the accelerometers do truly measure accelerations, then the corresponding load factor is calculated by subtracting the acceleration due to gravity along each axis.

FIG. 2 is an illustration of a stability-axis drag model, which is created as the aircraft 18 operates at high speed conditions. The high speed conditions are described in greater detail below. As seen in FIG. 2, the parameters $X_B$, $Y_B$, and $Z_B$ represent the x, y, and z body axes of the aircraft 18 respectively, and CG represents the center of gravity for the aircraft 18. The angle of attack α is measured between a body-axis $X_B$ of the aircraft 18 and a vector $X_S$, which represents a forward stability-axis of the aircraft 18. The forward stability-axis $X_S$ is a projection of an airspeed direction $X_W$ of the aircraft 18 onto a plane defined by the x and z axes. The angle of sideslip β is measured between the forward stability-axis $X_S$ and the airspeed direction $X_W$ of the aircraft 18.

Turning back to FIG. 1, all of the operating parameters 20 may be available as inputs from sensors. However, sometimes the angle of attack α, the angle of sideslip β, and the static pressure ps may be calculated or estimated values instead of sensed values. Specifically, the static pressure ps may be measured by a reliable static source such as a static port or, in another embodiment the static pressure ps is calculated based on the geometric altitude of the aircraft 18. In one non-limiting embodiment, the geometric altitude may be obtained from a global positioning system (GPS). In one embodiment, the angle of attack α may be derived from inertial measurements of the aircraft 18. However, in another approach, the angle of attack α may also be provided by angle of attack sensors. The angle of sideslip β may be measured by a sensor, or estimated based on aerodynamic side force model of the aircraft 18. In another embodiment, the angle of sideslip β is derived from inertial measurements.

Continuing to refer to FIG. 1, in one embodiment the airspeed system 10 may be used as a primary source to determine the airspeed of the aircraft 18. In another approach, the airspeed system 10 may be used as an independent source of airspeed, and is used to monitor another source of airspeed such as, for example, a pitot tube. Specifically, the airspeed system 10 may be used to determine the accuracy of a pitot tube (not illustrated). In still another embodiment, the airspeed system 10 may be used as only one of multiple airspeed sources.

Figure 3:
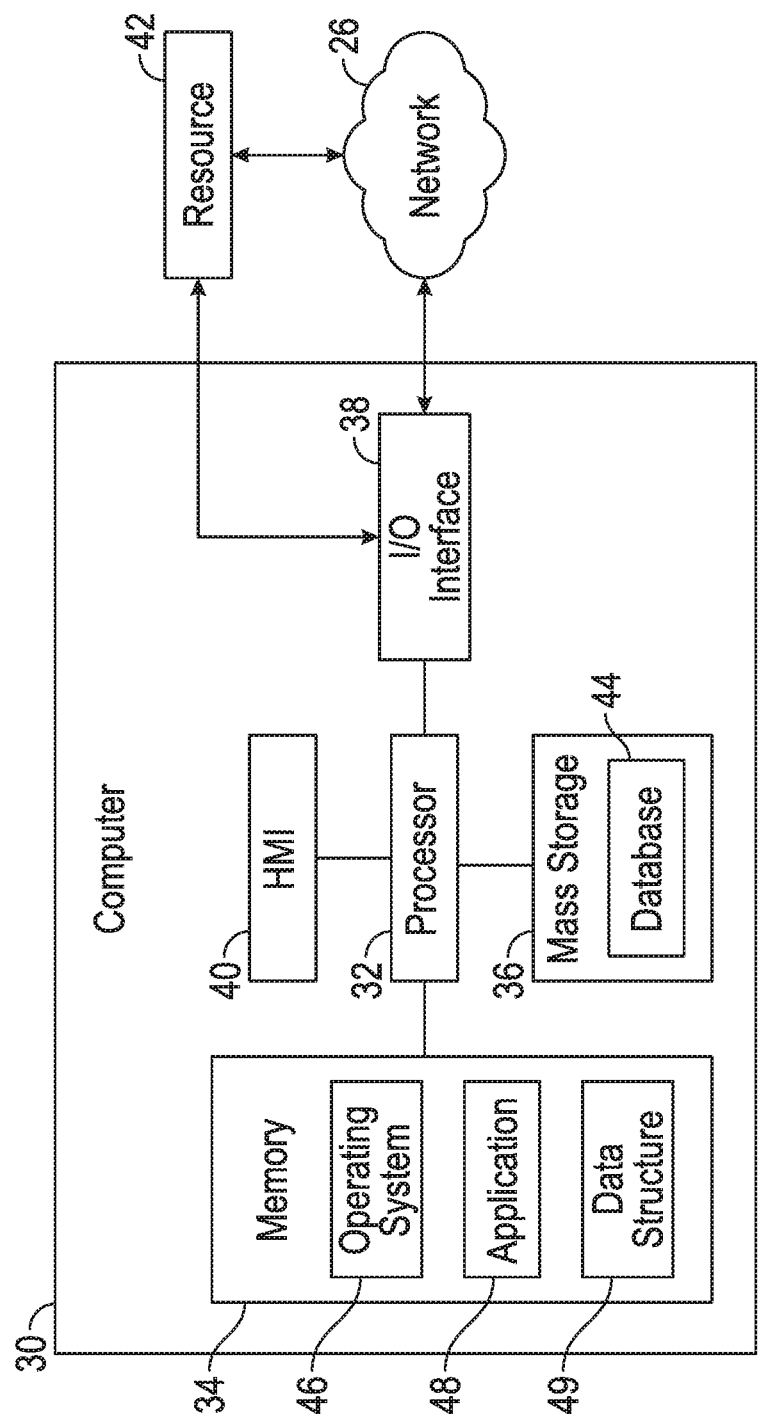
FIG. 3 is an illustration of a computer system used by the airspeed calculation system of FIG. 1.

Referring now to FIG. 3, the airspeed system 10 is implemented on one or more computer devices or systems, such as exemplary computer system 30. The computer system 30 includes a processor 32, a memory 34, a mass storage memory device 36, an input/output (I/O) interface 38, and a Human Machine Interface (HMI) 40. The computer system 30 is operatively coupled to one or more external resources 42 via the network 26 or I/O interface 38. External resources may include, but are not limited to, servers, databases, mass storage devices, peripheral devices, cloud-based network services, or any other suitable computer resource that may be used by the computer system 30.

The processor 32 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 includes data storage devices such as a hard drive, optical drive, tape drive, volatile or non-volatile solid state device, or any other device capable of storing information.

The processor 32 operates under the control of an operating system 46 that resides in memory 34. The operating system 46 manages computer resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 49 also reside in memory 34, and may be used by the processor 32, operating system 46, or application 48 to store or manipulate data.

The I/O interface 38 provides a machine interface that operatively couples the processor 32 to other devices and systems, such as the network 26 or external resource 42. The application 48 thereby works cooperatively with the network 26 or external resource 42 by communicating via the I/O interface 38 to provide the various features, functions, applications, processes, or modules comprising embodiments of the invention. The application 48 also includes program code that is executed by one or more external resources 42, or otherwise rely on functions or signals provided by other system or network components external to the computer system 30. Indeed, given the nearly endless hardware and software configurations possible, persons having ordinary skill in the art will understand that embodiments of the invention may include applications that are located externally to the computer system 30, distributed among multiple computers or other external resources 42, or provided by computing resources (hardware and software) that are provided as a service over the network 26, such as a cloud computing service.

The HMI 40 is operatively coupled to the processor 32 of computer system 30 in a known manner to allow a user to interact directly with the computer system 30. The HMI 40 may include video or alphanumeric displays, a touch screen, a speaker, and any other suitable audio and visual indicators capable of providing data to the user. The HMI 40 also includes input devices and controls such as an alphanumeric keyboard, a pointing device, keypads, pushbuttons, control knobs, microphones, etc., capable of accepting commands or input from the user and transmitting the entered input to the processor 32.

A database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules.

Figure 4:
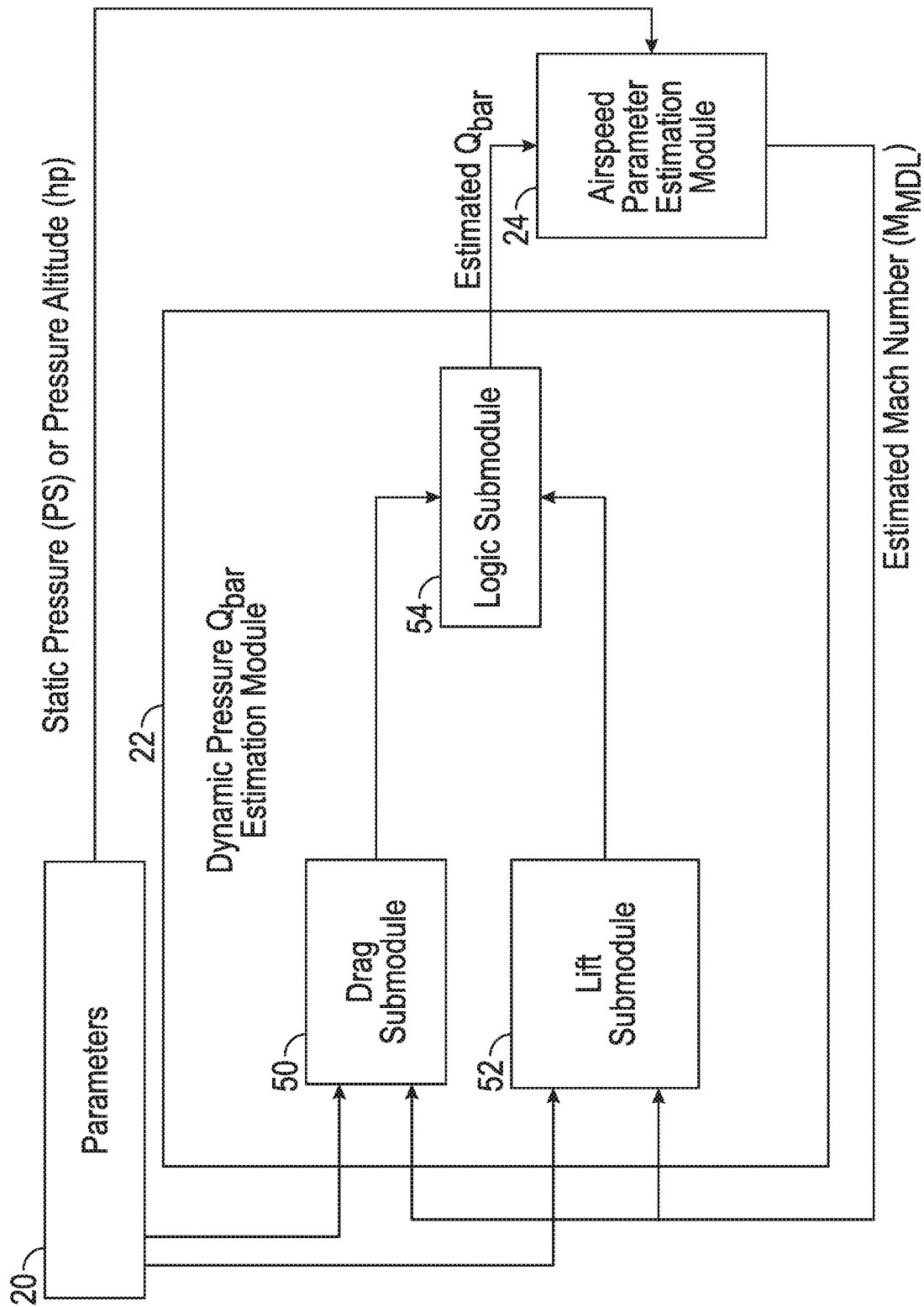
FIG. 4 is an exemplary block diagram of a dynamic pressure module of the airspeed calculation system shown in FIG. 1, where the dynamic pressure module includes a drag submodule and a lift submodule.

FIG. 4 is a block diagram illustrating the dynamic pressure module 22 and the airspeed parameter estimation module 24 in FIG. 1. The dynamic pressure module 22 includes submodules 50, 52, 54. The submodules 50, 52, 54 are shown as distinct components, which may indicate the use of modular programming techniques. However, the software design may decrease the extent to which the submodules 50, 52, 54 are distinct by combining at least some program functions of multiple modules into a single module. Moreover, the functions attributed to the submodules 50, 52, 54 may be distributed in other ways, or on other systems than those depicted. Thus, embodiments of the invention are not limited to the specific arrangement of systems or modules shown in FIG. 4.

The submodule 50 is a drag submodule 50 that estimates a drag based dynamic pressure $Qbar_{drag}$, which is based on a drag model of the aircraft 18 (FIG. 1). The drag based dynamic pressure $Qbar_{drag}$ is used to determine the dynamic pressure Qbar unless the aircraft 18 operates at low speed conditions. The airspeed system 10 determines that the aircraft 18 operates at high speed conditions in response to determining that the flaps 28 of the aircraft 18 (FIG. 2) are retracted, and in response to receiving an estimated Mach number $M_{MDL}$ having a value greater than about 0.4 from the airspeed parameter estimation module 24. The airspeed system 10 determines that the aircraft 18 operates at low speed conditions in response to determining that the flaps of the aircraft 18 are not retracted or, alternatively, in response to receiving an estimated Mach number $M_{MDL}$ having a value equal to or less than about 0.4 from the airspeed parameter estimation module 24.

The submodule 52 is a lift submodule 52 that determines a low speed dynamic pressure $Qbar_{lift}$ assuming the aircraft 18 operates at low speed conditions. The logic submodule 54 is a speed logic switch. As explained below and seen in FIG. 10, the logic submodule 54 receives as input a high speed dynamic pressure $Qbar_{drag}$ determined by the drag submodule 50 and the dynamic pressure $Qbar_{lift}$ determined by the lift submodule 52, and determines an estimated dynamic pressure Qbar based on the operating conditions of the aircraft 18 (FIG. 1). When the airspeed system 10 transitions between the high speed conditions and the low speed conditions, the logic submodule 54 of the airspeed system 10 employs a hysteresis logic and a transition smoothing algorithm 94 to determine the estimated dynamic pressure Qbar. The hysteresis logic and the transition smoothing algorithm 94 are described in greater detail below.

The airspeed parameter estimation module 24 receives as input the dynamic pressure Qbar from the dynamic pressure module 22 as well as the static pressure ps or the pressure altitude hp. As explained below, the airspeed parameter estimation module 24 determines the estimated Mach number $M_{MDL}$, the equivalent airspeed $Veas_{MDL}$, the impact pressure $Qc_{MDL}$, the calibrated airspeed $Vcas_{MDL}$, and the true airspeed of the aircraft $Vt_{MDL}$ based on the inputs. As seen in FIG. 4, the estimated Mach number $M_{MDL}$ is returned to the submodules 50, 52 of the dynamic pressure module 22 as feedback input.

Calculation of the dynamic pressure $Qbar_{drag}$ determined by the drag submodule 50 will now be discussed. FIG. 2 illustrates a stability-axis drag D of the aircraft 18, which is created during high speed operating conditions. As seen in FIG. 2, the forward stability-axis $X_S$ is directed along the project of the direction of flight of the aircraft 18 onto $X_B Z_B$ plane. In other words, the forward stability-axis $X_S$ is not associated with a fixed direction of the aircraft 18. FIG. 2 also illustrates the stability-axis drag D in dashed or phantom line, which is directed in a direction that opposes the forward stability-axis $X_S$.

Figure 5:
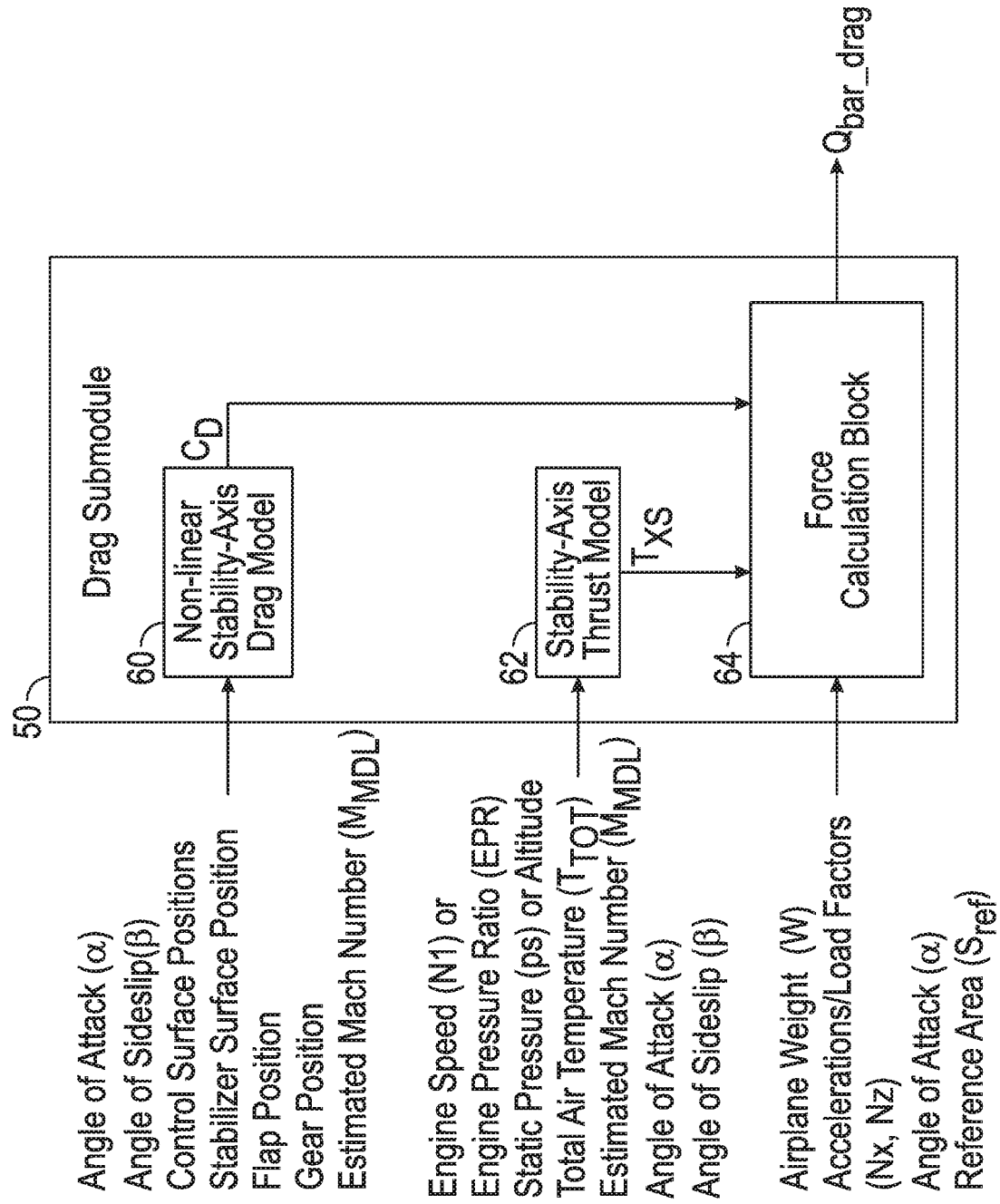
FIG. 5 is an exemplary block diagram of the drag submodule shown in FIG. 4, wherein the drag submodule includes a drag model, a thrust model, and a force calculation block.
Figure 6:
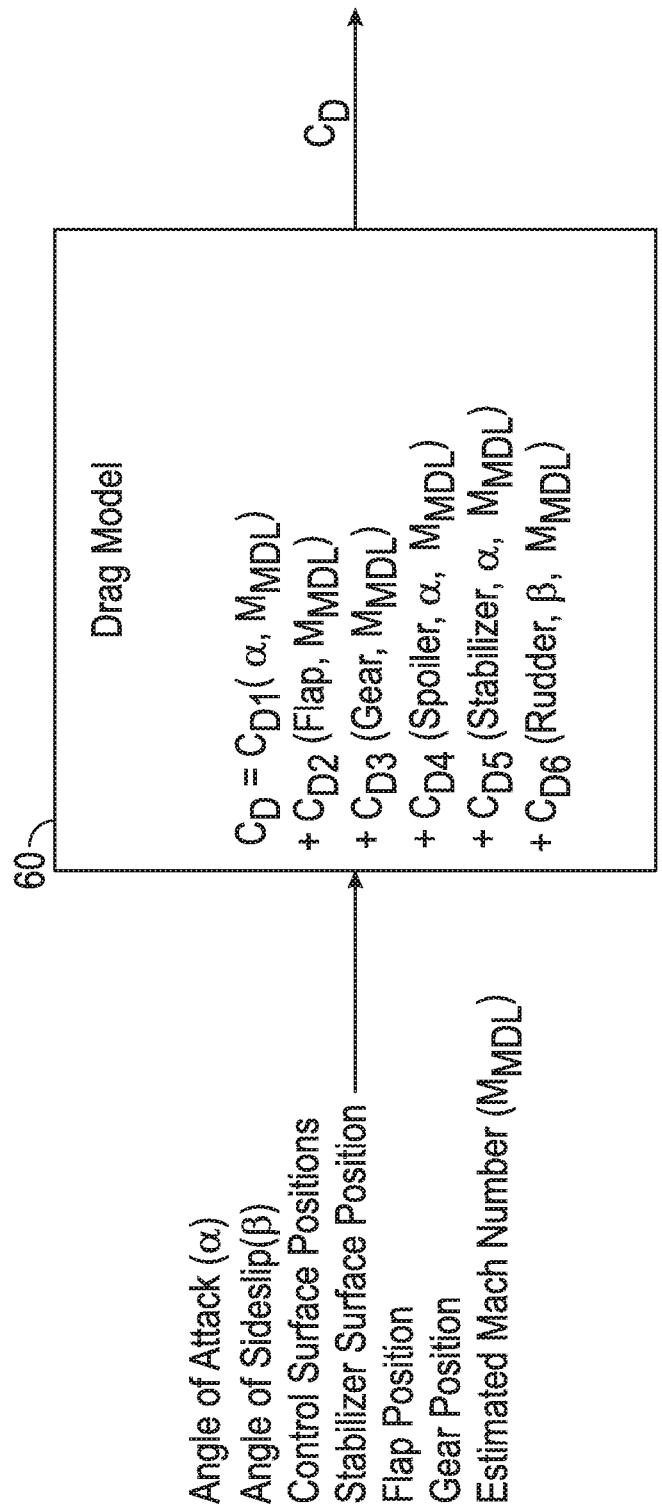
FIG. 6 is a detailed view of the drag model shown in FIG. 5.

FIG. 5 is a more detailed block diagram of the drag submodule 50. Referring now to both FIGS. 2 and 5, the drag submodule 50 includes a non-linear stability-axis drag model 60, a stability-axis thrust model 62, and a force calculation block 64 that determines the dynamic pressure $Qbar_{drag}$. FIG. 6 is a detailed block diagram of the drag model 60 of the drag submodule 50. Referring to both FIGS. 5 and 6, the drag model 60 receives as input the operating parameters 20, which each represent an operating condition of the aircraft 18, and determines a stability-axis drag coefficient $C_D$ based on the operating parameters 20. More specifically, the drag model 60 receives as input the angle of attack α, the angle of sideslip β, the control surface positions, the stabilizer surface position, the flap position, the landing gear position, and the estimated Mach number $M_{MDL}$ (from the airspeed parameter estimation module 24 seen in FIG. 4). As explained in greater detail below, the drag model 60 determines the stability-axis drag coefficient $C_D$ based on the inputs and a plurality of components $C_{D1}$-$C_{D6}$. The stability-axis drag coefficient $C_D$ quantifies the stability-axis drag D of the aircraft 18 illustrated in FIG. 2, where a lower stability-axis drag coefficient $C_D$ indicates less drag.

The components $C_{D1}$-$C_{D6}$ are tabular functions of the inputs (i.e., the angle of attack α, the angle of sideslip β, the control surface positions, the stabilizer surface position, the flap position, the landing gear position, and the estimated Mach number $M_{MDL}$). As seen in FIG. 6, the stability-axis drag coefficient $C_D$ is determined by Equation 1 as:

$$C_D = C_{D1}(\alpha, M_{MDL}) + C_{D2}(\text{Flap}, M_{MDL}) + C_{D3}(\text{Gear}, M_{MDL}) + C_{D4}(\text{Spoiler}, \alpha, M_{MDL}) + C_{D5}(\text{stabilizer}, \alpha, M_{MDL}) + C_{D6}(\text{rudder}, \beta, M_{MDL}) \quad \text{Equation 1}$$

where Flap represents the flap position indicative of the position of trailing edge flaps 28 (FIG. 2) of the wings 16, Gear represents the landing gear position, Spoiler represents the various positions of the spoilers 8 (FIG. 2), Stabilizer represents the stabilizer surface position, and rudder represents the position of the rudder 6 of the aircraft 18 (FIG. 2). The components $C_{D1}$-$C_{D6}$ are each determined based on respective lookup tables saved in memory 34 of the airspeed system 10 (FIG. 3). For example, the component $C_{D1}$ is determined by taking the specific values of the angle of attack α and the estimated Mach number $M_{MDL}$, finding these values on one of the lookup tables, and then determining the component $C_{D1}$ based on the specific values of the angle of attack α and the estimated Mach number $M_{MDL}$. Moreover, the components $C_{D4}$-$C_{D6}$ are each determined based on a three-dimensional lookup table. In an alternative embodiment, the components $C_{D1}$-$C_{D6}$ are determined based on mathematical functions, such as polynomials.

Continuing to refer to FIG. 6, it is to be appreciated that the stability-axis drag coefficient $C_D$ increases in value as the Mach number of the aircraft 18 enters a transonic region (i.e., between 0.8 to 1.0). Accordingly, Equation 1 provides a relatively accurate estimate (i.e., up to about 5%) of the stability-axis drag coefficient $C_D$ even at transonic Mach numbers. Furthermore, the stability-axis drag coefficient $C_D$ is relatively insensitive to the angle of attack α, especially at smaller values. Therefore, the resulting airspeed that is eventually calculated by the airspeed system 10 is not overly sensitive to small errors in measuring or determining the angle of attack. Specifically, assuming error in parameters used in the calculation of drag and thrust, the airspeed may be accurate by about 5%.

The value of the stability-axis drag coefficient $C_D$ does not go to zero, or become negligible. Therefore, the model shown in FIG. 6 may estimate the airspeed accurately, even during conditions where the normal load factor reaches zero g-force. Finally, the stability coefficient $C_D$ of many aircraft current available is not significantly affected by aeroelasticity or by unsteady aerodynamics. Accordingly, Equation 1 does not include factors for these effects. However, in an embodiment additional terms may be introduced to Equation 1 in order to account for aeroelasticity or unsteady aerodynamics, which may improve the accuracy of the stability-axis drag coefficient $C_D$.

Figure 7:
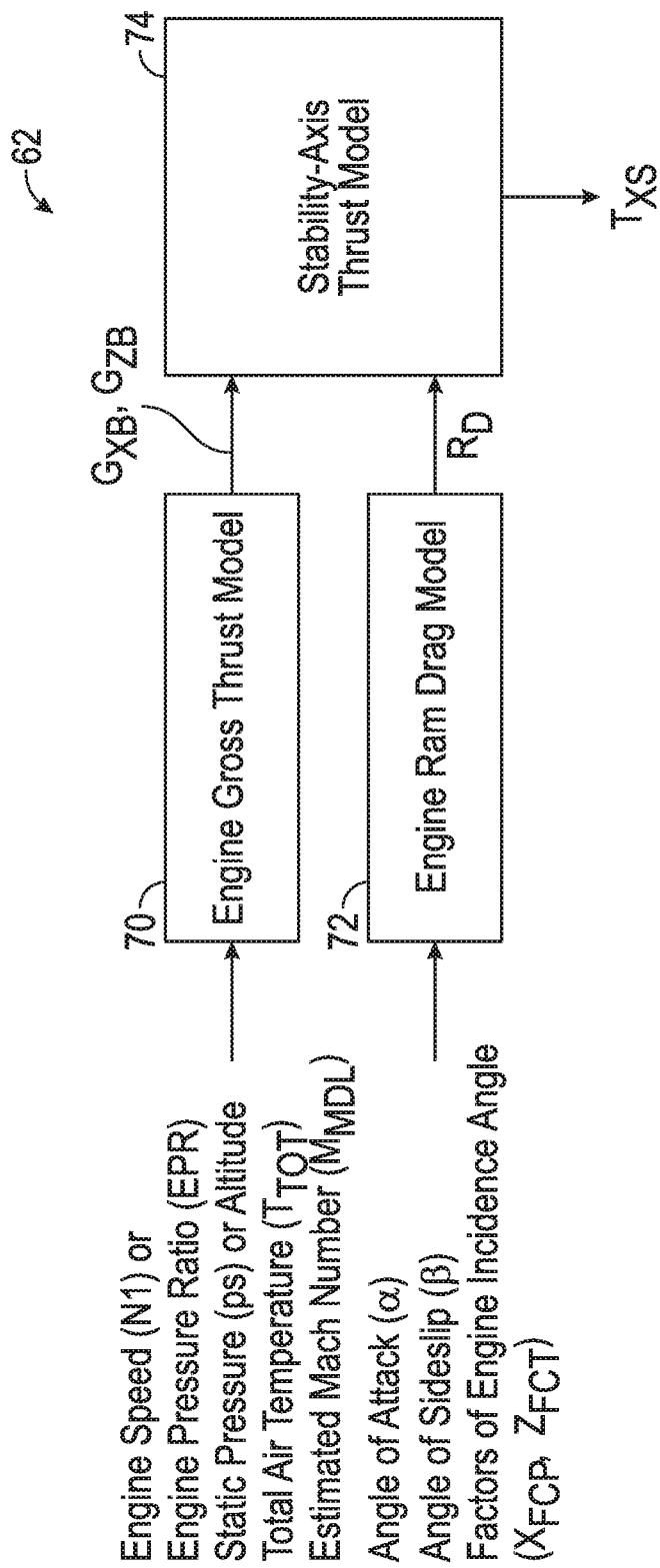
FIG. 7 is a detailed view of the thrust model illustrated in FIG. 5.

FIG. 7 is a detailed view of the thrust model 62 illustrated in FIG. 5. As seen in FIG. 7, the thrust model 62 includes an engine gross thrust model block 70, an engine ram drag model 72, and a stability-axis thrust block 74 that determines a forward stability-axis thrust component $T_{XS}$. The thrust model 62 receives as input the engine speed N1 or engine pressure ratio EPR, the static pressure ps or altitude, the total air temperature $T_{TOT}$, the Mach estimate $M_{MDL}$, the angle of attack α, and the angle of sideslip β. Additionally, the thrust model 62 also receives as input a factor of engine incidence angle $x_{FCT}$, which is with respect to the body-axis $X_B$ (FIG. 2) and a factor of engine incidence angle $z_{FCT}$, which is with respect to the axis $Z_B$ (FIG. 2). Both the factors of engine incidence angles $x_{FCT}$, $z_{FCT}$ are geometric constants, and are fixed values based on the specific installation of a turbojet engine of the aircraft 18 (not illustrated).

The gross thrust of the aircraft turbojet engine (not illustrated in the figures) is the thrust produced by the outlet flow of an aircraft turbojet engine. The engine gross thrust model block 70 receives the input and determines two gross thrust components, $G_{XB}$ and $G_{ZB}$. The gross thrust component $G_{XB}$ is the gross thrust with respect to the body-axis $X_B$ (FIG. 2), and the gross thrust component $G_{ZB}$ is the gross thrust with respect to the axis $Z_B$ (FIG. 2). The gross thrust component $G_{XB}$ is determined based on Equation 2, and the gross thrust component $G_{ZB}$ is determined based on Equation 3. Equations 2 and 3 are listed below as:

$$G_{XB} = T1(N1, ps, M_{MDL}, T_{TOT}) x_{XFCT} \quad \text{Equation 2}$$

$$G_{ZB} = T1(N1, ps, M_{MDL}, T_{TOT}) z_{XFCT} \quad \text{Equation 3}$$

where T1 is a tabular function of the engine speed N1, the static pressure ps, the estimated Mach number $M_{MDL}$, and the total air temperature $T_{TOT}$.

Continuing to refer to FIG. 7, the engine ram drag model 72 determines a ram drag $R_D$. The ram drag represents the drag caused by the momentum of incoming air into the turbojet engine of the aircraft 18 (not illustrated). The ram drag $R_D$ is determined by Equation 4, which is:

$$R_D = T2(N1, ps, M_{MDL}, T_{TOT}) \quad \text{Equation 4}$$

where T2 is a tabular function of the engine speed N1, the static pressure ps, the estimated Mach number $M_{MDL}$, and the total air temperature $T_{TOT}$.

The stability-axis thrust block 74 of the system 10 determines the forward stability-axis thrust component $T_{XS}$ by subtracting the ram drag from the engine gross thrust. The ram drag is the drag caused by the momentum of incoming air into the turbojet engine of the aircraft 18, while the engine gross thrust is the total thrust produced by the aircraft turbojet engine. More specifically, the forward stability-axis thrust component $T_{XS}$ is determined by Equation 5, which is:

$$T_{XS} = G_{XB} \cos \alpha + G_{ZB} \sin \alpha - R_D \cos \beta \quad \text{Equation 5}$$

Turning back to FIG. 5, the stability-axis drag coefficient $C_D$ and the forward stability-axis thrust component $T_{XS}$ are both received as input by the force calculation block 64. The force calculation block 64 also receives as input the aircraft weight W, the acceleration/load factors Nx, Nz, the angle of attack α, and a reference area $S_{ref}$. The reference area $S_{ref}$ represents a wing planform area. The force calculation block 64 then determines the dynamic pressure $Qbar_{drag}$ created as the aircraft 18 operates at high speed conditions. The dynamic pressure $Qbar_{drag}$ is based on the force along the stability-axis $N_{XS}$. Equation 6 determines the force along the stability-axis $N_{XS}$, and Equation 7 determines the dynamic pressure $Qbar_{drag}$ created at high speed conditions.

$$N_{XS} = N_X \cos \alpha - N_Z \sin \alpha \quad \text{Equation 6}$$

$$Qbar_{drag} = (T_{XS} - N_{XS} W)/(C_D S_{ref}) \quad \text{Equation 7}$$

Figure 8:
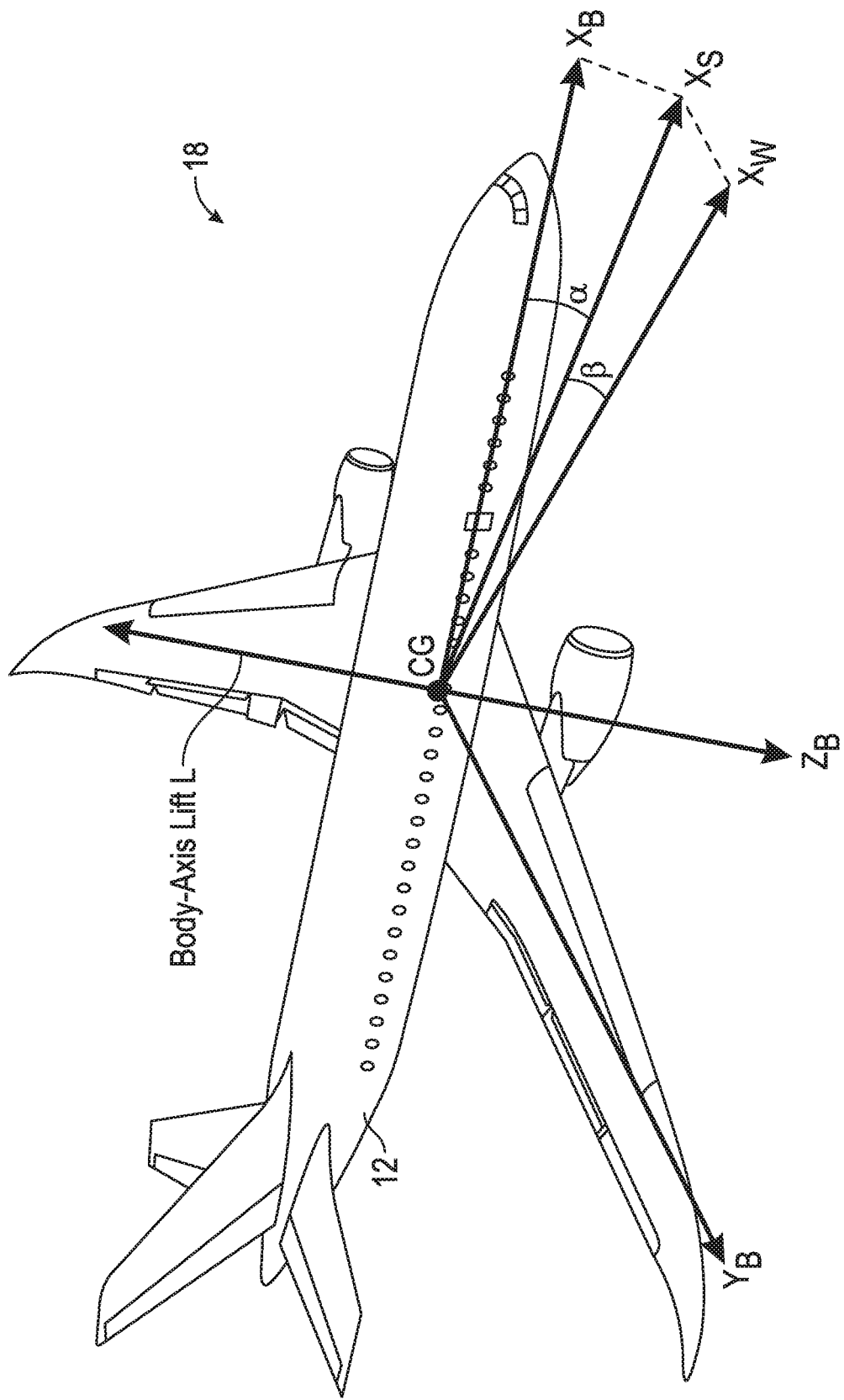
FIG. 8 is a perspective view of an exterior of the aircraft shown in FIG. 1, where a body-axis lift based on the aircraft operating at low speed conditions is illustrated.

Calculation of the dynamic pressure $Qbar_{lift}$ determined by the lift submodule 52 will now be discussed. FIG. 8 is an illustration of a body-axis lift model as the aircraft 18 operates at low speed conditions. As seen in FIG. 8, a body-axis lift L of the aircraft 18 is created in a direction that substantially opposes the axis $Z_B$. The body-axis lift L represents a force that generally opposes the weight of the aircraft 18 during level flight. It should be appreciated that force along the axis $Z_B$ is fixed with respect to the body 12 of the aircraft 18. Conventionally, the lift vector of an aircraft is expressed along a direction that is perpendicular to the direction of flight.

Figure 9:
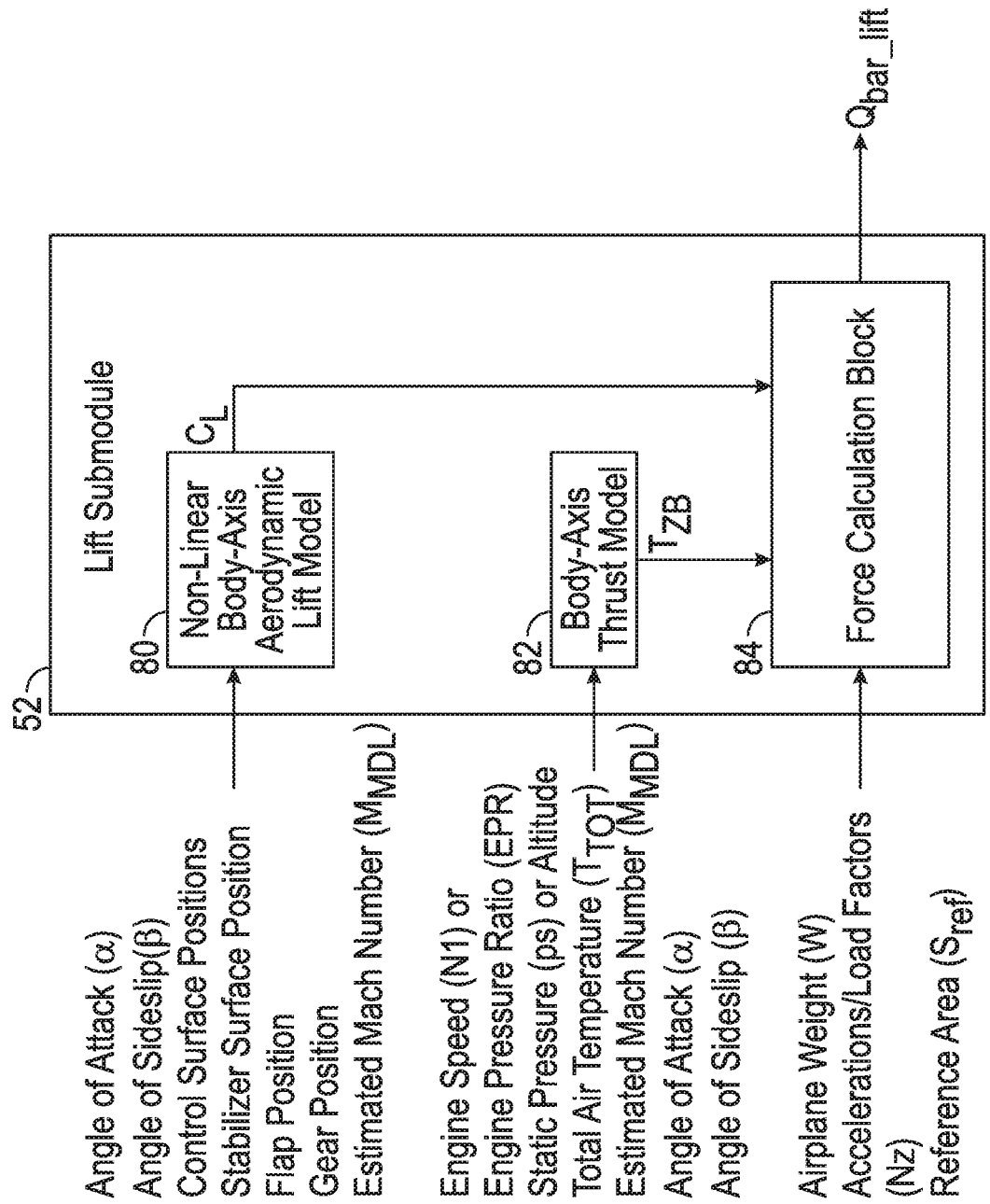
FIG. 9 is an exemplary block diagram of the lift submodule shown in FIG. 4.

FIG. 9 is an illustration of the lift submodule 52. Referring now to both FIGS. 8 and 9, the lift submodule 52 includes a non-linear body-axis aerodynamic lift module 80, a body-axis thrust model 82, and a force calculation block 84. As explained below, the aerodynamic lift module 80 determines a body-axis lift coefficient $C_L$, which corresponds to a lift L (FIG. 8) along the vertical body-axis $Z_B$ created during low speed operation of the aircraft 18.

Referring now to FIG. 9, the non-linear body-axis aerodynamic lift module 80 determines the body-axis lift coefficient $C_L$ based on the angle of attack $\alpha$, the angle of sideslip $\beta$, the control surface positions, the stabilizer surface position, the flap position, the landing gear position, and the estimated Mach number $M_{MDL}$ (from the airspeed parameter estimation module 24 as seen in FIG. 4). Similar to the stability-axis drag coefficient $C_D$, the body-axis lift coefficient $C_L$ is determined based on a plurality of components $C_{L1}$-$C_{L6}$. The components $C_{L1}$-$C_{L6}$ are tabular functions of the inputs (the angle of attack $\alpha$, the angle of sideslip $\beta$, the control surface positions, the stabilizer surface position, the flap position, the landing gear position, and the estimated Mach number $M_{MDL}$) and the body-axis lift coefficient $C_L$ is determined based on Equation 8 as:

$$C_L = C_{L1}(\alpha, M_{MDL}) + C_{L2}(\text{Flap}, M_{MDL}) + C_{L3}(\text{Gear}, M_{MDL}) + C_{L4}(\text{Spoiler}, \alpha, M_{MDL}) + C_{L5}(\text{stabilizer}, \alpha, M_{MDL})$$

Equation 8

The body-axis thrust model 82 determines a body-axis propulsive lift, which is referred to as $T_{ZB}$ based on Equation 9 as:

$$T_{ZB} = G_{ZB} - R_D \sin \alpha \cos \beta$$

Equation 9

The body-axis lift coefficient $C_L$ and the body-axis propulsive lift $T_{ZB}$ are both received as input by the force calculation block 84. The force calculation block 84 also receives as input the aircraft weight W, the acceleration/load factor Nz, and the reference area $S_{ref}$. The force calculation block 84 then determines the dynamic pressure $Qbar_{lift}$ created as the aircraft 18 operates at low speed conditions. The dynamic pressure $Qbar_{lift}$ is based on the force along the body-axis $Z_B$. Equation 10 determines the dynamic pressure $Qbar_{lift}$ as:

$$Qbar_{lift} = (N_Z W + T_{ZB}) / (C_L S_{ref})$$

Equation 10

Figure 10:
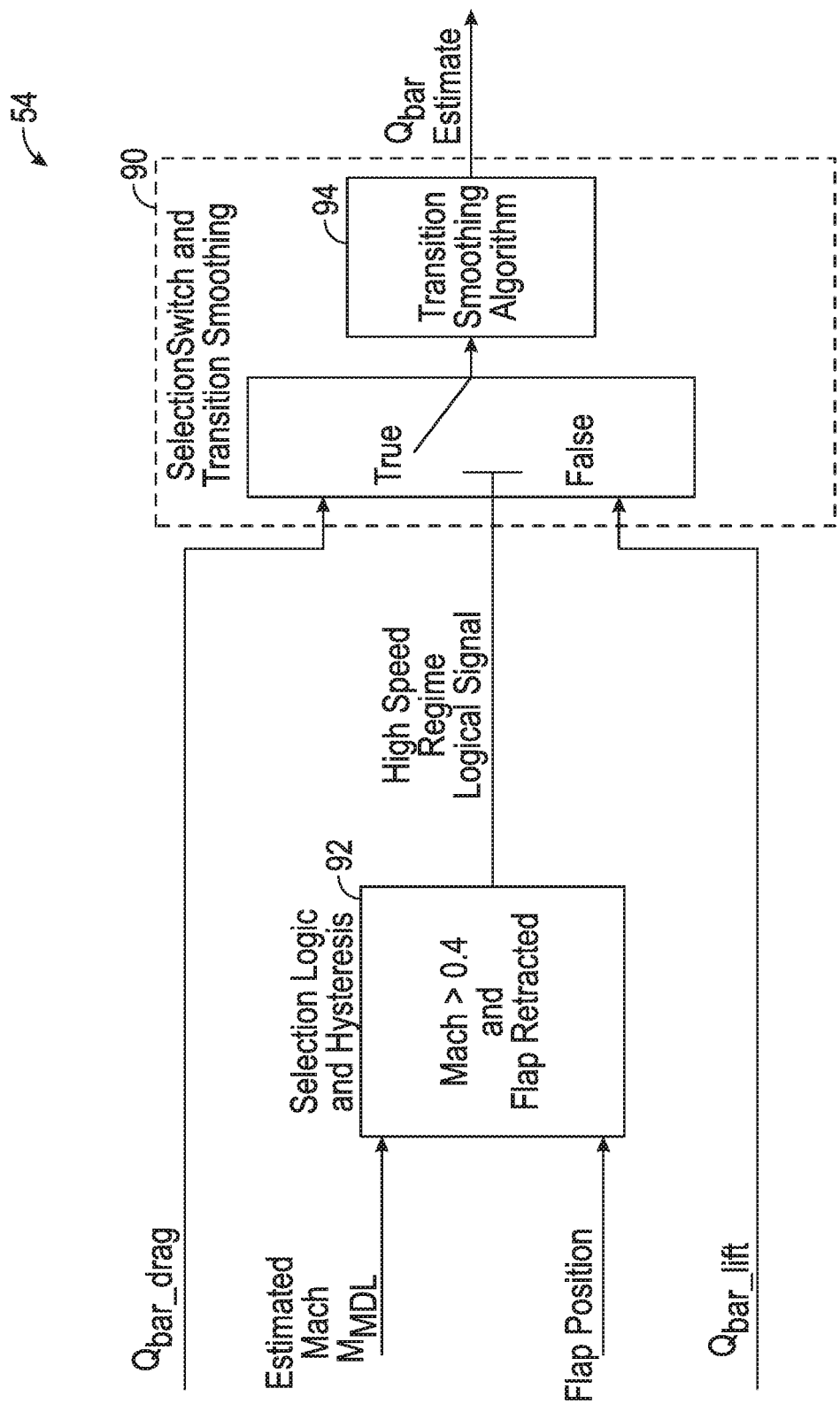
FIG. 10 is an exemplary block diagram of the logic submodule shown in FIG. 4.

Turning back to FIG. 4, the dynamic pressure $Qbar_{drag}$ from the drag submodule 50 and the dynamic pressure $Qbar_{lift}$ from the lift submodule 52 are both received by the logic submodule 54. As explained below, the logic submodule 54 estimates the dynamic pressure Qbar based on either the dynamic pressure $Qbar_{drag}$ or the dynamic pressure $Qbar_{lift}$. In other words, the dynamic pressure Qbar is based on either the stability-axis drag coefficient $C_D$ or the body-axis lift coefficient $C_L$. FIG. 10 is an illustration of the logic submodule 54. As seen in FIG. 10, the logic submodule 54 includes a selection switch 90, which is used to select the dynamic pressure $Qbar_{drag}$ or the dynamic pressure $Qbar_{lift}$.

It is to be appreciated that FIG. 10 is merely an exemplary embodiment of the logic submodule 54. Indeed, the logic submodule 54 may be implemented by a variety of approaches for selecting the source of dynamic pressure Qbar. For example, in another embodiment a blending function based on a weighted average of two source values over a specified transition range of the Mach number $M_{MDL}$ and flap position may be used as well.

Continuing to refer to FIG. 10, the logic submodule 54 receives as input the dynamic pressure $Qbar_{drag}$ from the drag submodule 50, the estimated Mach number $M_{MDL}$, a signal indicative of the position of trailing edge flaps 28 (FIG. 2) of the wings 16, and the dynamic pressure $Qbar_{lift}$. The input is sent to a selection block 92. The selection block 92 generates a logical signal indicating true in response to the estimated Mach number $M_{MDL}$ having a value that is greater than about 0.4 and the flaps 28 being in a retracted position. The true signal indicates the aircraft 18 operating at the high speed condition. In response to the logical signal indicating that the aircraft 18 (FIG. 1) is operating at the high speed condition, the switch 90 selects the dynamic pressure $Qbar_{drag}$ from the drag submodule 50 as the estimated dynamic pressure Qbar.

At all other conditions the aircraft 18 is determined to be operating at the low speed condition, and the selection block 92 sets the logical signal to false. More specifically, the selection block 92 generates a logical signal indicating false in response to the estimated Mach number $M_{MDL}$ having a value less than or equal to about 0.4, or in response to the flaps 28 not being retracted (i.e., deployed). The false signal indicates the aircraft 18 is operating at the low speed condition. In response to the logical signal indicating that the aircraft 18 is operating at the low speed condition, the switch 90 selects the dynamic pressure $Qbar_{lift}$ from the lift submodule 52 as the estimated dynamic pressure Qbar.

The selection block 92 also includes a hysteresis logic. The hysteresis logic may substantially prevent continuous toggling between two sources if the Mach number $M_{MDL}$ is near the 0.4 threshold. Specifically, in response to the estimated Mach number $M_{MDL}$ increasing from a value below about 0.4 to a value that is greater than about 0.4 by a margin of about 0.02, and in response to the flaps 28 (FIG. 2) being retracted, the hysteresis logic changes the logical signal created by the selection block 92 from false to true. Accordingly, the hysteresis logic determines that the aircraft 18 is switching from the low speed conditions to the high speed conditions. The hysteresis logic is used to determine that the Mach number changes in value from below about 0.4 to a value that is substantially above 0.4, which in turn substantially prevents continuous toggling. Similarly, in response to estimated Mach number $M_{MDL}$ subsequently decreasing to value less than or equal to about 0.4 by a margin of about 0.02, the hysteresis logic changes the logical signal created by the selection block 92 from true to false. Accordingly, the hysteresis logic determines that the aircraft 18 is switching from the high speed conditions to the low speed conditions.

Continuing to refer to FIG. 10, the switch 90 also includes the transition smoothing algorithm 94. The transition smoothing algorithm 94 provides a smooth transition as the estimated dynamic pressure Qbar switches from one source value to another. Specifically, a value of the estimated dynamic pressure Qbar is switched between the dynamic pressure $Qbar_{drag}$ and the dynamic pressure $Qbar_{lift}$ based on the transition smoothing algorithm 94, where the transition smoothing algorithm 94 gradually changes the value of the estimated dynamic pressure Qbar over a period of time. The period of time to transition between the dynamic pressure values $Qbar_{drag}$, $Qbar_{lift}$ is about several seconds. The transition smoothing algorithm 94 may be based on any number of different approaches such as, but not limited to, a transient-free switch.

Referring back to FIG. 4, the estimated dynamic pressure Qbar is then sent to the airspeed parameter estimation module 24. The airspeed parameter estimation module 24 then determines the airspeed parameters, which include the estimated Mach number $M_{MDL}$, the equivalent airspeed $Veas_{MDL}$, the impact pressure $Qc_{MDL}$, the calibrated airspeed $Vcas_{MDL}$, and the true airspeed $Vt_{MDL}$ of the aircraft 18. The airspeed parameters are used to constantly calculate the airspeed of the aircraft 18. The true airspeed $Vt_{MDL}$ represents the aircraft 18 velocity relative to a free air stream, and the equivalent airspeed $Veas_{MDL}$ is the true airspeed corrected by the local air density. The calibrated airspeed $Vcas_{MDL}$ is computed based on impact pressure $Qc_{MDL}$. The estimated Mach number $M_{MDL}$ is determined based on Equation 11, the equivalent airspeed $Veas_{MDL}$ is based on Equation 12, the impact pressure $Qc_{MDL}$ is based on Equation 13, the calibrated airspeed $Vcas_{MDL}$ is based on Equation 14, and the true airspeed $Vt_{MDL}$ is based on Equation 15:

$$M_{MDL} = 1.195\sqrt{Qbar/ps} \quad \text{Equation 11}$$

$$Veas_{MDL} = \sqrt{295.374 Qbar} \quad \text{Equation 12}$$

$$Qc_{MDL} = [(1+0.2 M_{MDL}^2)^{7/2} - 1] ps \quad \text{Equation 13}$$

$$Vcas_{MDL} = 661.5\sqrt{5[(Qc_{MDL}/p_0 + 1)^{2/7} - 1]} \quad \text{Equation 14}$$

$$Vt_{MDL} = 38.97 M_{MDL} \sqrt{T_{TOT}/(1+0.2 M_{MDL}^2)} \quad \text{Equation 15}$$

where the equivalent airspeed $Veas_{MDL}$, the calibrated airspeed $Vcas_{MDL}$, and the true airspeed $Vt_{MDL}$ are all measured in knots, the dynamic pressure Qbar, and the impact pressure $Qc_{MDL}$ are both in pounds per square foot, $p_0$ represents standard day pressure at sea level, and the total air temperature $T_{TOT}$ is expressed in Kelvin.

Referring generally to the figures, the disclosed airspeed system provides a reliable approach for estimating the airspeed, without the need to depend upon traditional pitot probe measurements. As explained above, the airspeed system includes a drag model that may be used to estimate various airspeed parameters during high speed regimes of the aircraft. Accordingly, the airspeed system provides a relatively accurate estimate of the airspeed parameters throughout the transonic flight envelope. In contrast, a system based solely on a lift model may not be able to calculate accurate airspeeds during high speed flight regimes, especially at transonic Mach numbers. Additionally, the airspeed calculated by a system based solely on a lift model may be susceptible to variations of a sensed angle of attack of the aircraft at high speeds, or when the aircraft is at a relatively low weight. The disclosed airspeed system also includes decreased sensitivity to variations in the angle of attack when compared to the lift-based systems that are currently available.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A system for estimating a plurality of airspeed parameters for constantly calculating an airspeed of an aircraft, the system comprising:
   one or more processors; and
   a memory coupled to the one or more processors, the memory storing data comprising a database and program code that, when executed by the one or more processors, causes the system to:
   receive a plurality of operating parameters that each represent an operating condition of the aircraft;
   determine a stability-axis drag coefficient based on the plurality of operating parameters, wherein the stability-axis drag coefficient quantifies a stability-axis drag of the aircraft created during high speed conditions;
   determine a body-axis lift coefficient based on the plurality of operating parameters, wherein the body-axis lift coefficient corresponds to a lift of the aircraft created along a vertical body-axis during low speed conditions;
   determine the aircraft is operating at either the high speed conditions or the low speed conditions based on a flap position of a plurality of flaps of the aircraft and a value of an estimated Mach number;
   in response to determining the aircraft is operating at the low speed conditions, estimate a dynamic pressure based on the body-axis lift coefficient;
   in response to determining the aircraft is operating at the high speed conditions, estimate the dynamic pressure based on the stability-axis drag coefficient; and
   estimate the plurality of airspeed parameters based on the dynamic pressure.

2. The system of claim 1, wherein the system is caused to determine that the aircraft is operating at the high speed conditions based on:
   determining that the plurality of flaps of the aircraft are retracted; and
   in response to receiving the estimated Mach number having a value greater than about 0.4.

3. The system of claim 1, wherein the system is caused to determine that the aircraft is operating at the low speed conditions based on:
   determining that the plurality of flaps of the aircraft are not retracted; or
   in response to receiving the estimated Mach number having a value less than or equal to about 0.4.

4. The system of claim 1, wherein the system determines:
   in response to the estimated Mach number increasing from a value below about 0.4 to a value that is greater than about 0.4 by a margin of about 0.02, and in response to a plurality of flaps being retracted, a hysteresis logic determines the aircraft is switching from the low speed conditions to the high speed conditions; and
   in response to the estimated Mach number decreasing to value less than or equal to about 0.4 by a margin of about 0.02, the hysteresis logic determines the aircraft is switching from the high speed conditions to the low speed conditions.

5. The system of claim 1, wherein the system is caused to:
   switch a value of the estimated dynamic pressure between a dynamic pressure and a dynamic pressure based on a transition smoothing algorithm, wherein the transition smoothing algorithm gradually changes the value of the estimated dynamic pressure over a period of time.

6. The system of claim 1, wherein the airspeed parameters include the estimated Mach number, an equivalent airspeed, an impact pressure, a calibrated airspeed, and a true airspeed of the aircraft.

7. The system of claim 1, wherein the plurality of operating parameters include an angle of attack, an angle of sideslip, a plurality of control surface positions including a plurality of spoiler positions and a rudder position, a stabilizer surface position, a flap position, a landing gear position, and an estimated Mach number.

8. The system of claim 7, wherein the stability-axis drag coefficient is determined as:

$$C_D = C_{D1}(\alpha, M_{MDL}) C_{D2}(\text{Flap}, M_{MDL}) + C_{D3}(\text{Gear}, M_{MOL}) + C_{D4}(\text{Spoiler}, \alpha, M_{MDL}) C_{D5}(\text{stabilizer}, \alpha, M_{MOL}) + C_{D6}(\text{rudder}, \beta, M_{MDL})$$

wherein Flap represents the flap position indicative of a position of trailing edge flaps of wings, Gear represents the landing gear position, Spoiler represents a plurality of spoiler positions, Stabilizer represents the stabilizer surface position, rudder represents the rudder position, and components $C_{D1}$-$C_{D6}$ are each determined based on respective lookup tables saved in the memory.

9. The system of claim 1, wherein the system estimates a high speed dynamic pressure based on a drag model of the aircraft, and wherein the high speed dynamic pressure is used to determine the dynamic pressure unless the aircraft operates at low speed conditions.

10. The system of claim 9, wherein the high speed dynamic pressure is determined based on a forward stability-axis component thrust, and wherein the forward stability-axis thrust component is determined by subtracting a ram drag of a turbojet engine from a gross engine thrust of the turbojet engine.

11. A method of estimating a plurality of airspeed parameters for constantly calculating an airspeed of an aircraft, the method comprising:
receiving, by a computer, a plurality of operating parameters that each represent an operating condition of the aircraft;
determining, by the computer, a stability-axis drag coefficient based on the plurality of operating parameters, wherein the stability-axis drag coefficient quantifies a stability-axis drag of the aircraft created during high speed conditions;
determining, by the computer, a body-axis lift coefficient based on the plurality of operating parameters, wherein the body-axis lift coefficient corresponds to a lift of the aircraft created along a vertical body-axis during low speed conditions;
determining, by the computer, the aircraft is operating at either the high speed conditions or the low speed conditions based on a flap position of a plurality of flaps of the aircraft and a value of an estimated Mach number;
in response to determining the aircraft is operating at the low speed conditions, estimating, by the computer, a dynamic pressure based on the body-axis lift coefficient;
in response to determining the aircraft is operating at the high speed conditions, estimating, by the computer, the dynamic pressure based on stability-axis drag coefficient; and
estimating, by the computer, the plurality of airspeed parameters based on the dynamic pressure.

12. The method of claim 11, comprising determining the aircraft is operating at the high speed conditions based on:
determining, by the computer, that the plurality of flaps of the aircraft are retracted; and
in response to receiving the estimated Mach number having a value greater than about 0.4.

13. The method of claim 11, comprising determining the aircraft is operating at the low speed conditions based on:
determining, by the computer, the plurality of flaps of the aircraft are retracted; or
in response to receiving the estimated Mach number having a value less than or equal to about 0.4.

14. The method of claim 11, comprising:
in response to the estimated Mach number ($M_{MOL}$)]] increasing from a value below about 0.4 to a value that is greater than about 0.4 by a margin of about 0.02, and
in response to the plurality of flaps being retracted, determining the aircraft is switching from the low speed conditions to the high speed conditions by a hysteresis logic; and
in response to the estimated Mach number decreasing to value less than or equal to about 0.4 by a margin of about 0.02, determining, by the computer, the aircraft is switching from the high speed conditions to the low speed conditions by the hysteresis logic.

15. The method of claim 11, comprising switching, by the computer, a value of the estimated dynamic pressure between a dynamic pressure and a dynamic pressure based on a transition smoothing algorithm, wherein the transition smoothing algorithm gradually changes the value of the estimated dynamic pressure over a period of time.

16. The method of claim 11, wherein the airspeed parameters include an estimated Mach number, an equivalent airspeed, an impact pressure, a calibrated airspeed, and a true airspeed of the aircraft.

17. The method of claim 11, wherein the plurality of operating parameters include an angle of attack, an angle of sideslip, a plurality of control surface positions including a spoiler position and a rudder position, a stabilizer surface position, a plurality of flap positions, a landing gear position, and an estimated Mach number.

18. The method of claim 17, comprising determining the stability-axis drag coefficient by:

$$C_D = C_{D1}(\alpha, M_{MDL}) C_{D2}(\text{Flap}, M_{MDL}) + C_{D3}(\text{Gear}, M_{MOL}) + C_{D4}(\text{Spoiler}, \alpha, M_{MDL}) C_{D5}[[(\text{stabilizer}, \alpha, M_{MDL}) + C_{D6}(\text{rudder}, \beta, M_{MDL})$$

wherein Flap represents the flap position indicative of a position of trailing edge flaps of wings, Gear represents the landing gear position, Spoiler represents the plurality of spoiler positions, Stabilizer represents the stabilizer surface position, rudder represents the rudder position, and components $C_{D1}$-$C_{D6}$ are each determined based on respective lookup tables saved in a memory of the computer.

19. The method of claim 11, comprising estimating, by the computer, a high speed dynamic pressure based on a drag model of the aircraft, and wherein the high speed dynamic pressure is used to determine the dynamic pressure unless the aircraft operates at the low speed conditions.

20. The method of claim 19, comprising determining, by the computer, the high speed dynamic pressure based on a forward stability-axis thrust component, wherein the forward stability-axis thrust component is determined by subtracting a ram drag from a gross engine thrust of a turbojet engine of the aircraft.

21. A system for estimating a plurality of airspeed parameters for constantly calculating an airspeed of an aircraft, the system comprising:
    one or more processors; and
    a memory coupled to the one or more processors, the memory storing data comprising a database and program code that, when executed by the one or more processors, causes the system to:
        receive a plurality of operating parameters that each represent an operating condition of the aircraft;
        determine a stability-axis drag coefficient based on the plurality of operating parameters, wherein the stability-axis drag coefficient quantifies a stability-axis drag of the aircraft created during high speed conditions;
        determine a body-axis lift coefficient based on the plurality of operating parameters, wherein the body-axis lift coefficient corresponds to a lift of the aircraft created along a vertical body-axis during low speed conditions;
        estimate a dynamic pressure based on one of the stability-axis drag coefficient and the body-axis lift coefficient; and
        estimate the plurality of airspeed parameters based on the dynamic pressure, wherein the stability-axis drag coefficient is determined as:

$$C_D = C_{D1}(\alpha, M_{MOL})C_{D2}(\text{Flap}, M_{MOL})C_{D3}(\text{Gear}, M_{MOL}) + C_{D4}(\text{Spoiler}, \alpha, M_{MOL})C_{D5}(\text{stabilizer}, \alpha, M_{MOL}) + C_{D6}(\text{rudder}, \beta, M_{MDL})$$

wherein Flap represents the flap position indicative of a position of trailing edge flaps of wings, Gear represents the landing gear position, Spoiler represents a plurality of spoiler positions, Stabilizer represents the stabilizer surface position, rudder represents the rudder position, and components $C_{D1}$-$C_{D6}$ are each determined based on respective lookup tables saved in the memory.

22. A method of estimating a plurality of airspeed parameters for constantly calculating an airspeed of an aircraft, the method comprising:
    receiving, by a computer, a plurality of operating parameters that each represent an operating condition of the aircraft;
    determining, by the computer, a stability-axis drag coefficient based on the plurality of operating parameters, wherein the stability-axis drag coefficient quantifies a stability-axis drag of the aircraft created during high speed conditions;
    determining, by the computer, a body-axis lift coefficient based on the plurality of operating parameters, wherein the body-axis lift coefficient corresponds to a lift of the aircraft created along a vertical body-axis during low speed conditions;
    estimating, by the computer, a dynamic pressure based on one of the stability-axis drag coefficient and the body-axis lift coefficient; and
    estimating, by the computer, the plurality of airspeed parameters based on the dynamic pressure by:

$$C_D = C_{D1}(\alpha, M_{MDL})C_{D2}(\text{Flap}, M_{MOL}) + C_{D3}(\text{Gear}, M_{MDL}) + C_{D4}(\text{Spoiler}, \alpha, M_{MDL})C_{D5}(\text{stabilizer}, \alpha, M_{MOL}) + C_{D6}(\text{rudder}, \beta, M_{MDL})$$

wherein Flap represents the flap position indicative of a position of trailing edge flaps of wings, Gear represents the landing gear position, Spoiler represents the plurality of spoiler positions, Stabilizer represents the stabilizer surface position, rudder represents the rudder position, and components $C_{D1}$-$C_{D6}$ are each determined based on respective lookup tables saved in a memory of the computer.

\* \* \* \* \*

UNITED STATES PATENT AND TRADEMARK OFFICE
CERTIFICATE OF CORRECTION

PATENT NO. : 10,768,201 B2
APPLICATION NO. : 15/620224
DATED : September 8, 2020
INVENTOR(S) : Jia Luo and Douglas Lee Wilson It is certified that error appears in the above-identified patent and that said Letters Patent is hereby corrected as shown below:

In the Claims

At Column 13, Lines 14-16, Claim 8 reads:
$C_D=C_{D1}(\alpha,M_{MDL})C_{D2}(Flap,M_{MDL})+C_{D3}(Gear, M_{MOL})+C_{D4}(Spoiler,\alpha,M_{MOL})C_{D5}(stabilizer,\alpha, M_{MOL})+C_{D6}(rudder,\beta,M_{MDL})$ Should read:
$C_D = C_{D1}(\alpha, M_{MDL}) + C_{D2}(Flap, M_{MDL}) + C_{D3}(Gear, M_{MDL}) + C_{D4}(Spoiler, \alpha, M_{MDL}) + C_{D5}(stabilizer, \alpha, M_{MDL}) + C_{D6}(rudder, \beta, M_{MDL})$ At Column 14, Line 15, Claim 14 reads:
in response to the estimated Mach number ($M_{MOL}$)]]

Should read:
in response to the estimated Mach number

At Column 14, Lines 46-49, Claim 18 reads:
$C_D=C_{D1}(\alpha,M_{MDL})C_{D2}(Flap,M_{MDL})+C_{D3}(Gear, M_{MOL})+C_{D4}(Spoiler,\alpha,M_{MDL})C_{D5}[[(stabilizer,\alpha, M_{MDL})+C_{D6}(rudder,\beta,M_{MDL})$ Should read:
$C_D = C_{D1}(\alpha, M_{MDL}) + C_{D2}(Flap, M_{MDL}) + C_{D3}(Gear, M_{MDL}) + C_{D4}(Spoiler, \alpha, M_{MDL}) + C_{D5}(stabilizer, \alpha, M_{MDL}) + C_{D6}(rudder, \beta, M_{MDL})$ Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,768,201 B2

At Column 15, Lines 27-29, Claim 21 reads:
$C_D = C_{D1}(\alpha, M_{MOL}) C_{D2}(\text{Flap}, M_{MOL}) C_{D3}(\text{Gear}, M_{MOL}) + C_{D4}(\text{Spoiler}, \alpha, M_{MOL}) C_{D5}(\text{stabilizer}, \alpha, M_{MOL}) + C_{D6}(\text{rudder}, \beta, M_{MDL})$ Should read:
$C_D = C_{D1}(\alpha, M_{MDL}) + C_{D2}(\text{Flap}, M_{MDL}) + C_{D3}(\text{Gear}, M_{MDL}) + C_{D4}(\text{Spoiler}, \alpha, M_{MDL}) + C_{D5}[[ (\text{stabilizer}, \alpha, M_{MDL}) + C_{D6}(\text{rudder}, \beta, M_{MDL})$ At Column 16, Lines 24-26, Claim 22 reads:
$C_D = C_{D1}(\alpha, M_{MDL}) C_{D2}(\text{Flap}, M_{MOL}) + C_{D3}(\text{Gear}, M_{MDL}) + C_{D4}(\text{Spoiler}, \alpha, M_{MDL}) C_{D5}(\text{stabilizer}, \alpha, M_{MOL}) + C_{D6}(\text{rudder}, \beta, M_{MDL})$ Should read:
$C_D = C_{D1}(\alpha, M_{MDL}) + C_{D2}(\text{Flap}, M_{MDL}) + C_{D3}(\text{Gear}, M_{MDL}) + C_{D4}(\text{Spoiler}, \alpha, M_{MDL}) + C_{D5}(\text{stabilizer}, \alpha, M_{MDL}) + C_{D6}(\text{rudder}, \beta, M_{MDL})$